Nov. 15, 1938.     F. TYSON     2,136,958
MICROMETER APPARATUS FOR ANGLE MEASUREMENTS AND OTHER PURPOSES
Filed Jan. 23, 1937
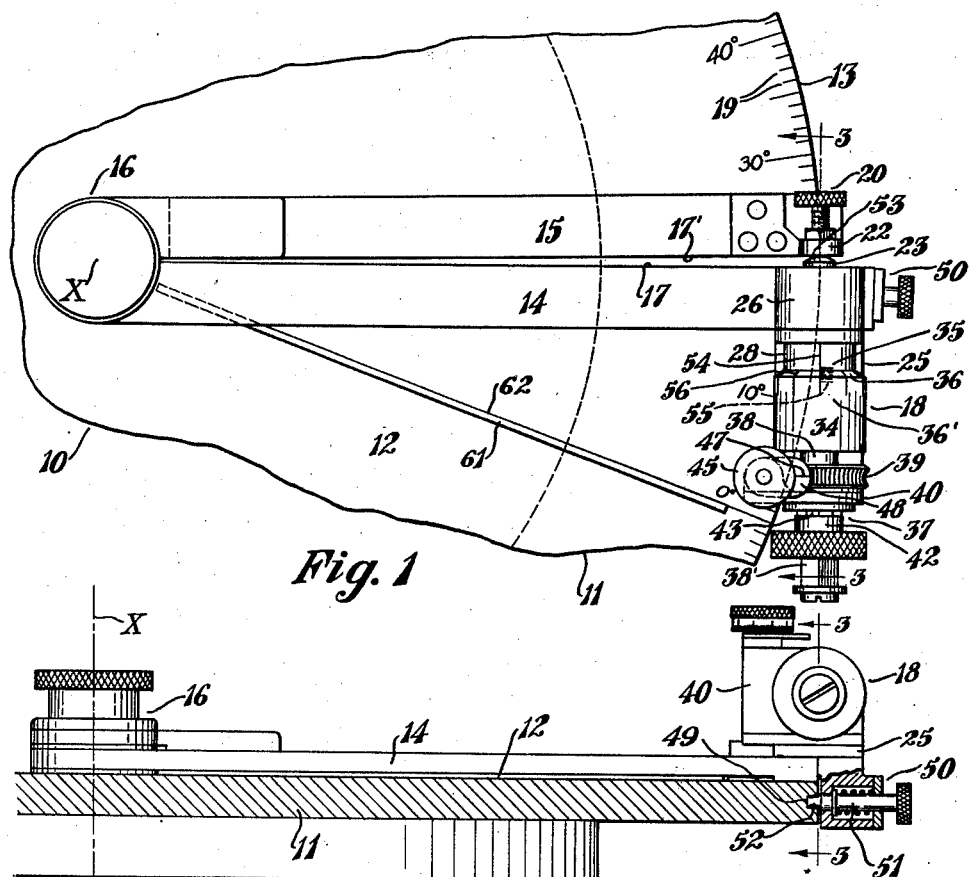
Fig. 1
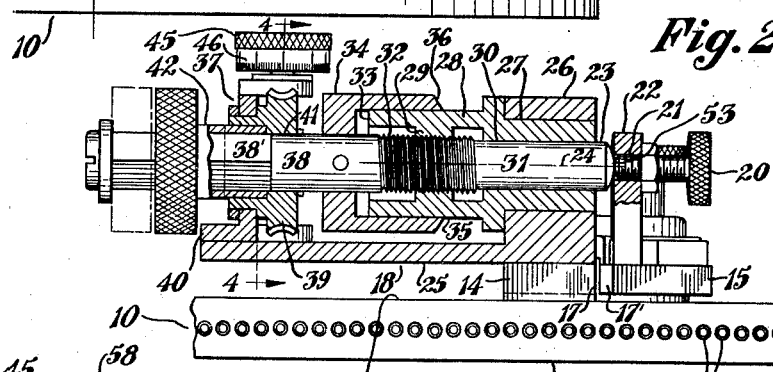
Fig. 2
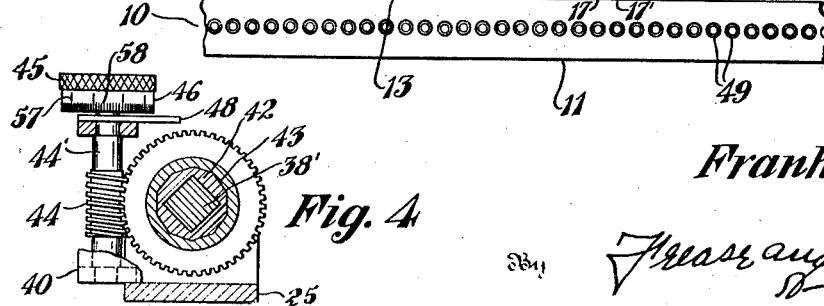
Fig. 3
Fig. 4
Inventor
Frank Tyson
By Freese and Bishop
Attorneys Patented Nov. 15, 1938

2,136,958

UNITED STATES PATENT OFFICE 2,136,958

MICROMETER APPARATUS FOR ANGLE MEASUREMENTS AND OTHER PURPOSES

Frank Tyson, Canton, Ohio

Application January 23, 1937, Serial No. 122,035

15 Claims. (Cl. 33—75)

My invention relates to apparatus for measuring, laying off, and establishing angles in divisions of angular measure.

Usual apparatus for such purposes, such as vernier protractors, are not effective for measuring, laying off, or establishing angular divisions smaller than 5 minutes of angular measure.

From another standpoint, micrometers as usually made are not provided with means by which very small advances or retractions of the spindle not only may be effected with ease and with a relatively high degree of accuracy, but also so that any particular setting of the micrometer spindle will be automatically locked until released or another setting is made.

The objects of the present improvements include the provision of improved micrometer apparatus particularly adapted for measuring, laying off, and establishing angles in divisions of angular measure of the magnitude of minutes and seconds of angular measure, and even of the magnitude of $\frac{1}{10}$ of a second of angular measure.

Further objects of the present improvements include provision of improved micrometer apparatus including mechanical means for effecting very small advances or retractions of the spindle of the micrometer, which may be of the magnitude of $\frac{1}{360,000}$ inch, and which mechanical means preferably at the same time locks any particular setting of the micrometer spindle until released or a new setting of the micrometer spindle is made.

Further objects of the improvements include the provision of improved general and detail arrangements comprising a micrometer apparatus and parts thereof so as to provide not only for relatively finer adjustment of the micrometer, but also for easier operation of the same, than can be attained with usual micrometers.

Further objects of the improvements include the provision of improved micrometer apparatus particularly adapted for use in tool rooms for making angle templets and gauge blocks having a relatively high degree of precision which may be of the magnitude of $\frac{1}{10}$ second of angular measure.

The foregoing and other objects are attained by the micrometer apparatus, parts, combinations, and sub-combinations, which comprise the present invention, and the nature of which is set forth in the following general statement, and preferred embodiments of which are set forth in the following description, and which are particularly and distinctly pointed out and set forth in the appended claims forming part hereof.

The nature of the improved micrometer apparatus of the present invention may be stated in general terms as including two angle members, preferably angle bars, each mounted for selective pivotal movement about the same axis.

The angle bars are preferably pivotally mounted on a base having an angle measuring face, the pivotal axis extending through the center of an angle measuring circle delineated on the angle measuring face of the base.

Preferably improved micrometer means are operative between the angle bars, the micrometer means including a spacing member preferably a spindle longitudinaly movable with respect to its longitudinal axis and preferably screw and nut means for longitudinally moving or advancing or retracting the preferred spindle spacing member and the moving means for the spacing member being stationary with respect to and preferably mounted on one of the angle bars and the spacing member being operable against the other angle bar so as to selectively space and measure in divisions of angular measure any selected angle within prescribed limits between radii of the angle bars preferably in planes extending through the pivotal axis.

The angle measuring circle is equal in circumference to 360 divisions of linear measure, the unit of linear measure preferably being the inch, and when the circumference of the angle measuring circle is 36 inches, radius divisions may be inscribed on the angle measuring face spaced from each other along the angle measuring circle $\frac{1}{10}$ inch, the angle between each pair of angle measuring divisions thus being 1 degree of angular measure.

The micrometer means operative to selectively space the angle bars furthermore includes for longitudinally moving the spacing member a co-operating micrometer screw and nut having 60 threads per unit of linear measure, and when the unit of linear measure is the inch, for the purpose of the present improvements the micrometer screw and nut would have 60 threads per inch, the longitudinal axis of the micrometer spacing member or spindle being tangent to a circle equal to the angle measuring circle and having its center on the pivotal axis, the micrometer spindle being preferably an extension of the micrometer screw or nut.

Preferably selectively engageable and disengageable self-locking worm wheel and worm means are provided preferably for the screw of the micrometer means, when the nut is the stationary element thereof, whereby the screw and spindle of the micrometer may be rotated a relatively small portion of a turn, so that a linear change may be effected in the positoin of the end of the spindle as small as 1/360,000 inch, which would provide for angular measurement on a 36 inch angle measuring circle of 1/10 second in angular measure and multiples thereof.

By way of example, embodiments of the improved micrometer apparatus and micrometer hereof are illustrated in the accompanying drawing forming part hereof, in which Figure 1 is a fragmentary top plan view of an embodiment of the improved micrometer apparatus, including the improved micrometer, in the form of an instrument particularly suited for use, not only for measuring, laying off, and establishing angles in divisions of angular measure which may be as small as 1/10 second, but also for making angle templets, if desirable substantially to the same accuracy;

Fig. 2, an elevation view thereof, with portions broken away and shown in section;

Fig. 3, an enlarged elevation view thereof looking in the direction of the arrows 3—3, Figs. 1 and 2, with portions of the improved micrometer broken away and shown in section, for more clearly illustrating details thereof; and Fig. 4, a transverse sectional view of the improved micrometer, as on line 4—4, Fig. 3, illustrating the improved selective automatic locking fine setting means for the improved micrometer.

Similar numerals refer to similar parts throughout the drawing.

The illustrated embodiment of the improved micrometer apparatus is indicated generally by 10, and includes a base disk 11 having a circular face 12 with an angle measuring circle 13 delineated and formed by the upper edge of the cylindric periphery of the base disk 11.

Two angle members or bars 14 and 15 are mounted as by pivot means 16 for selective pivotal movement about the same axis X, which in the apparatus 10 is an axis at right angles to the circular face 12 of the base disk 11 and passes through the center of the circular face 12, the angle bars 14 and 15 being pivotally movable over the circular face 12.

The angle bars 14 and 15 respectively have opposed radius side faces 17 and 17', which if extended would pass through the axis X, and which coincide in any selected positions with radii of the circular face 12, and the opposed radius side faces 17 and 17' of the angle bars 14 and 15 are adapted to abut each other and coincide with any selected radius of the circular face 12.

Improved micrometer means indicated generally by 18 include parts operative between the angle bars or members 14 and 15 so as to space and measure in divisions of angular measure any selected angle within prescribed limits between radii of the angle bars preferably in planes passing through the pivotal axis X. In the apparatus 10 the measurable angles are those selected between the opposed radius side faces 17 and 17' of the angle bars 14 and 15, which include radii of the angle bars in planes passing through the axis X.

According to the invention the delineated circle 13 of the apparatus 10 has a circumference which is equal to 360 divisions of linear measure, and in the apparatus 10 the unit of linear measure used is the inch, and the circumference of the circle 13 is made to be 36 inches, and 360 equally spaced radius division markings or graduations 19 of the circle 13 are inscribed on the circular face 12, the distance between each pair of division markings 19 on said circle 13 thus being equal to 1/10 inch, and in angular measure each pair of division markings 19 thus are spaced from each other 1 degree.

As shown, the improved micrometer means 18 includes preferably adjustable screw anvil or abutment means 20 screw mounted in a threaded opening 21 provided in a bracket 22 secured upon and extending upwardly from the angle member or bar 15.

The improved micrometer means 18 furthermore includes a longitudinally movable spacing member preferably a spindle 23 longitudinally movable with respect to its longitudinal axis, and improved associated parts presently to be described for longitudinally moving or advancing and retracting the spindle, all preferably operatively mounted upon the angle member or bar 14.

The micrometer spindle 23 as shown, and preferably, is so located on the angle bar 14, that the longitudinal axis 24 of the spindle is tangent to a circle having the same circumference as the angle measuring circle 13 and having its center on the axis X, or in other words a circle equal to and parallel with the circle 13, which as aforesaid is 36 inches in circumference.

The longitudinal axis of the screw anvil means 20 is likewise so located on the angle bar 15, that it is tangent to the same circle as that to which the longitudinal axis 24 of the spindle 23 is tangent.

The improved micrometer parts mounted on the angle bar 14 furthermore include a mounting means, as shown a base bracket 25 secured upon the angle bar 14, and including an upstanding boss 26 having a bore 27 in which is fitted a preferably externally flanged micrometer sleeve 28 which as shown has formed in the opening thereof the micrometer nut 29 and a spindle guide bore 30 for the forward cylindric portion 31 of the spindle.

The spindle 23 furthermore is provided with a central micrometer screw 32 which screws in the micrometer nut 29.

The micrometer spindle 23 extends beyond the rear end face 33 of the sleeve 28, and beyond the sleeve end face 33 the spindle 23 has mounted thereon a thimble 34. The micrometer sleeve 28 includes the externally cylindric graduated or marked portion 35, over which operates the graduated beveled end face 36 of the tubular portion 36' of the thimble 34.

Preferably releasable self locking mechanical means indicated generally by 37 are operatively mounted on the base bracket 25 and associated with the rear end portions 38 and 38' of the screw spindle 23 for effecting very small fractions of one turn of the screw spindle 23 in the nut 29, and thus for effecting very small longitudinal displacements of the spindle 23.

As shown, and preferably, the releasable self-locking mechanical means 37 consist of worm wheel and worm means including a worm wheel 39 journalled in a bearing bracket 40 provided on the rear end of the base bracket 25.

The worm wheel 39 has a central opening through which extends the rear end portions 38 and 38' of the screw spindle 23. The rear end portion 38 of the spindle 23 is preferably externally cylindric and the forward portion 41 of the central opening of the worm wheel 39 is preferably internally cylindric and fits on the cylindric portion 38 of the spindle.

As shown, the means for releasably engaging the worm wheel 39 with the spindle 23, includes forming the rear end portion 38' of the spindle 23 square in cross-section and slidably mounting thereon a clutch sleeve 42 which is internally square and slidably fits on the square spindle portion 38'.

As shown, the clutch sleeve 42 has an external ten-sided end 43 which is selectively slidable into and out of engagement with the ten-sided rear end portion of the central opening of the worm wheel 39.

The preferred worm wheel and worm means furthermore includes a worm 44 journalled in the bracket 40 and meshed with the worm wheel 39, thus locking the worm wheel against rotation except by rotation of the worm.

The worm includes a shaft 44' extending above the bearing bracket 40, and the shaft 44' has mounted on its upper end an indexing and turning knob 45, the cylindric graduated portion 46 of which is used in conjunction with an index mark 47 provided on a plate 48 carried by the bracket 40.

For facilitating use of the micrometer apparatus 10, the cylindric periphery of the base disk 11 has formed therein 360 equally spaced preferably tapered indexing sockets 49, and upon the outer end of the angle bar 14 is provided preferably spring pressed releasable index pin means 50 having the index pin 51 with a tapered inner end 52 releasably fitting any of the sockets 49. The pin 51 is radially disposed and its location and the locations of the sockets 49 are such that the angle bar 14 may be latched in position with its radius side face 17 coinciding with any of the degree markings 19 of the circular angle measuring face 12.

The number of threads of the micrometer screw 32 and co-operating nut 29 per unit of linear measure is preferably 60 and in the illustrated micrometer apparatus 10 having the angle measuring circle 13 which is 36 inches in circumference, the number of threads of the micrometer screw 32 and nut 29 are 60 per inch.

Accordingly, one turn of the micrometer screw spindle 23 longitudinally displaces the spindle and its forward end face 53 exactly $\frac{1}{60}$ inch or 10 minutes of angular measure on the circle 13. Consequently $\frac{1}{10}$ turn of the micrometer screw spindle 23 effects a longitudinal displacement thereof equal to $\frac{1}{600}$ inch or 1 minute of angular measure on the circle 13.

As shown, the externally cylindric graduated or marked portion 35 of the sleeve 28 is provided with an upper longitudinal index line 54 and at right angles thereto with seven transverse index lines 55 spaced from each other $\frac{1}{60}$ inch, and by which in co-operation with the peripheral edge of the thimble beveled end face 36, are used to indicate complete turns of the spindle 23, in the usual manner of reading a micrometer.

The beveled end face 36 of the thimble 34 has inscribed thereon to divide the face 36 into ten equal spaces radial and longitudinal index lines 56, by the use of which in conjunction with the sleeve longitudinal index line 54, $\frac{1}{10}$ turns of the spindle 23 may be effected so as to displace its end face 53 for each $\frac{1}{10}$ turn 1 minute of angular measure.

The worm wheel 39 is provided with 60 teeth, and the worm 44 is such that one turn thereof effects a fractional turn of the worm wheel equal to the angle between similar radii of adjacent worm wheel teeth, which in a 60 teeth worm equal $\frac{1}{60}$ turn thereof.

Accordingly, when the worm wheel 39 is engaged with the spindle 23, $\frac{1}{60}$ turn of the worm wheel will cause a like fractional turn of the screw spindle 23, and a displacement of its end face 53 equal to $\frac{1}{3600}$ inch or 10 seconds of angular measure.

The cylindric graduated portion 46 of the worm turning knob 45, as shown is provided with equally spaced longer index lines 57, dividing the cylindric portion 46 into ten equal spaces.

The lines 57 are used in conjunction with the index mark or line 47, to effect $\frac{1}{10}$ turn of the worm 39, which would thus displace the spindle end face 53 a distance equal to $\frac{1}{36,000}$ inch or 1 second of angular measure.

By further providing shorter equally spaced index lines 58 on the knob cylindric portion 46, dividing the space between adjacent lines 57 into ten equal spaces, the lines 58 may be used in conjunction with the line 47 to effect $\frac{1}{100}$ turn of the worm 39, which causes a displacement of the spindle end face 53 a distance equal to $\frac{1}{360,000}$ inch or $\frac{1}{10}$ second of angular measure.

In using the micrometer apparatus 10, the angle bar 14 is pivoted so that its radius side face 17 coincides with any selected degree division 19 of the angle measuring circle 13.

The initial adjustment of the micrometer means 18 is such, that operation of the screw spindle 23 so that the peripheral edge of the beveled thimble face 36 coincides with the rearmost index line 55, displaces the spindle 23 so that the extremity of its front end face 53 lies in the plane of the radius side face 17 of the angle bar 14.

The angle bar 15 is then pivoted towards the angle bar 14 so as to abut the radius side face 17' of the angle bar 15 against the radius side face 17 of the angle bar 14.

The screw anvil means 20 on the angle bar 15 has been initially adjusted so that its extremity opposite the extremity of the spindle outer end face 53 will be in abutment therewith when the angle bar side faces 17 and 17' abut or coincide.

Consequently with the angle bar's radius side faces 17 and 17' in abutment, the micrometer screw spindle may be operated to pivotally space the radius side faces 17 and 17' in measured divisions of minutes, seconds, and $\frac{1}{10}$ seconds of angular measure, which are readable on the micrometer means 18.

The above defined dimension of the angle measuring circle 13, and the specified threads for the micrometer screw 32 and nut 29, and the specified number of teeth for the worm wheel 39, are preferable for providing the micrometer apparatus 10 in convenient size, and for convenient operation. Obviously other relationships between the angle measuring circle 13 and the micrometer means 18 may be selected.

For adapting the micrometer apparatus 10 for making angle templates, the circular face 12 of the base disk 11 may have a radial rib 61 protruding upwardly therefrom with a radius side face 62 coinciding with the zero degree division of the circle 13.

Lower face portions of the angle bars 14 and 15 may be spaced to clear the rib 61, and permit placement under the angle bars of a templet plate with its edge against the zero radius face 62 of the rib 61.

Any selected setting of the angle bar 15 may then be attained and the angle thus established may be scribed on the templet plate using the radius side face 17' as a guide for the scribe.

The embodiments of the present improvements illustrated and described herein are by way of example, and the scope of the invention is not limited to the same or to the particular details thereof, but is commensurate with any and all novel subject matter contained herein which may at any time properly under the United States patent laws be set forth in claims hereof originating herein, the elements of any such claims being intended to include their reasonable equivalents.

I claim:—

1. Micrometer apparatus including two angle members mounted for selective pivotal movement about the same axis, and micrometer means operatively associated with the angle bars, the micrometer means including a mounting means secured to and immovable with respect to one of the angle bars and an abutment means on the other angle bar, and a spacing member movable longitudinally of itself in the mounting means on the one angle bar towards and away from the abutment means on the other angle bar.

2. Micrometer apparatus including two angle members mounted for selective pivotal movement about the same axis, and micrometer means operatively associated with the angle bars, the micrometer means including a mounting means secured to and immovable with respect to one of the angle bars, and a spacing member movable longitudinally of itself in the mounting means of the one angle bar towards and away from a radial plane passing through the pivotal axis of the angle members.

3. Micrometer apparatus including two angle members mounted for selective pivotal movement about the same axis, and micrometer means operatively associated with the angle bars, the micrometer means including a mounting means secured to one of the angle bars and a spacing member movable longitudinally of itself in the mounting means of the one angle bar towards and away from a radial plane passing through the pivotal axis of the angle members, and a cooperating screw and nut for operating the spacing member, and worm wheel and worm means for effecting fractions of one turn of the screw and nut with respect to each other.

4. Micrometer apparatus including two angle members mounted for selective pivotal movement about the same axis, and micrometer means operatively associated with the angle bars, the micrometer means including a mounting means secured to one of the angle bars and a spacing member movable longitudinally of itself in the mounting means of the one angle bar towards and away from a radial plane passing through the pivotal axis of the angle members, and a cooperating screw and nut for operating the spacing member, and releasable worm wheel and worm means for effecting fractions of one turn of the screw and nut with respect to each other.

5. Micrometer apparatus including two angle members mounted for selective pivotal movement about the same axis, and micrometer means operatively associated with the angle bars, the micrometer means including a mounting means secured to one of the angle bars and a spacing member movable longitudinally of itself in the mounting means of the one angle bar towards and away from a radial plane passing through the pivotal axis of the angle members, and a cooperating screw and nut for operating the spacing member, and worm wheel and worm means for effecting fractions of one turn of the screw and nut with respect to each other, the longitudinal axis of the spacing member being tangent to a circle whose circumference is 360 divisions of linear measure, the screw and nut having 60 threads per unit of linear measure, the worm wheel operating the screw and nut and having 60 teeth, and the worm being such that one turn thereof rotates the worm wheel the angular distance between similar radii of adjacent teeth of the worm wheel.

6. Micrometer apparatus including two angle members mounted for selective pivotal movement about the same axis, and micrometer means operatively associated with the angle bars, the micrometer means including a mounting means secured to one of the angle bars and a spacing member movable longitudinally of itself in the mounting means of the one angle bar towards and away from a radial plane passing through the pivotal axis of the angle members, and a cooperating screw and nut for operating the spacing member, and worm wheel and worm means for effecting fractions of one turn of the screw and nut with respect to each other, the longitudinal axis of the spacing member being tangent to a circle whose circumference is 360 divisions of linear measure, the unit of linear measure being the inch, the screw and nut having 60 threads per inch, the worm wheel operating the screw and nut and having 60 teeth, and the worm being such that one turn thereof rotates the worm wheel the angular distance between similar radii of adjacent teeth of the worm wheel.

7. Micrometer apparatus including a base having a circular face with a delineated circumference equal in divisions of linear measure to 360, two angle bars each pivotally mounted at the center of the circular face and pivotally movable thereover and having opposed radius side faces coinciding with radii of the circular face according to the positions to which the angle bars may be moved, the opposed radius side faces of the angle bars being adapted to abut each other on any selected radius of the circular face including any one of the 360 divisions thereof, and micrometer means operatively associated with the angle bars, the micrometer means including a mounting means secured to and immovable with respect to one of the angle bars and an abutment means on the other angle bar, and a spacing member movable longitudinally of itself in the mounting means on the one angle bar towards and away from the abutment means on the other angle bar, and the longitudinal axis of the spacing member being tangent to the delineated circumference, and a cooperating micrometer screw and nut for operating the spacing member, the screw and nut having a number of threads per linear measure of division of the delineated circumference so that the spacing member may space and angularly measure selected openings between the radius side faces of the angle bars in divisions of angular measure, each division of the delineated circumference corresponding to a degree of angular measure.

8. Micrometer apparatus including a base having an angle comparison face, two angle members each mounted for selective pivotal movement about an axis extending through a center of the angle comparison face and spacing means operatively associated with the angle members so as to space and measure in divisions of angular measure a selected angle between radii of the angle members, and the angle comparison face having a radial rib protruding therefrom with a radius side face for use as a zero radius.

9. Micrometer apparatus including a base having an angle comparison face, two angle bars each mounted for selective pivotal movement about an axis extending through a center of the angle comparison face, and micrometer means operatively associated with the angle bars, the micrometer means including a longitudinally movable spacing member operatively mounted on one angle bar, the spacing member having its longitudinal axis of movement tangent to a single circle whose center is on the pivotal axis.

10. Micrometer apparatus including two angle bars mounted for selective pivotal movement about the same axis, and micrometer means operatively associated with the angle bars, the micrometer means including a longitudinally movable spacing member operatively mounted on one angle bar, the spacing member having its longitudinal axis of movement tangent to a single circle whose center is on the pivotal axis of the angle bars.

11. Micrometer apparatus including an angle bar mounted for selective pivotal movement about an axis, and micrometer means mounted on the angle bar, the micrometer means including a longitudinally movable spacing member having its longitudinal axis of movement tangent to a single circle whose center is on the pivotal axis, and cooperating micrometer screw and nut members for moving the spacing member, the cooperating micrometer screw and nut members having 60 threads per unit of linear measure, one of the screw and nut members being stationary with respect to the angle bar and the other screw and nut member being connected for transmitting its longitudinal movements to the spacing member.

12. Micrometer apparatus including an angle bar mounted for selective pivotal movement about an axis, and micrometer means mounted on the angle bar, the micrometer means including a longitudinally movable spacing member having its longitudinal axis of movement tangent to a single circle whose center is on the pivotal axis, and cooperating micrometer screw and nut members for moving the spacing member, the cooperating micrometer screw and nut members having 60 threads per inch, one of the screw and nut members being stationary with respect to the angle bar and the other screw and nut member being connected for transmitting its longitudinal movements to the spacing member.

13. Micrometer apparatus including an angle bar mounted for selective pivotal movement about an axis, and micrometer means mounted on the angle bar, the micrometer means including a longitudinally movable spacing member having its longitudinal axis of movement tangent to a single circle whose center is on the pivotal axis, and cooperating micrometer screw and nut members for moving the spacing member, the cooperating micrometer screw and nut members having 60 threads per unit of linear measure, one of the screw and nut members being stationary with respect to the angle bar and the other screw and nut member being connected for transmitting its longitudinal movements to the spacing member, and the circle to which the longitudinal axis of the spacing member is tangent having a circumference equal to 360 equal divisions of linear measurement, the unit of linear measurement being the same as that for the threads of the micrometer screw and nut.

14. Micrometer apparatus including an angle bar mounted for selective pivotal movement about an axis, and micrometer means mounted on the angle bar, the micrometer means including a longitudinally movable spacing member having its longitudinal axis of movement tangent to a single circle whose center is on the pivotal axis, and cooperating micrometer screw and nut members for moving the spacing member, the cooperating micrometer screw and nut members having 60 threads per inch, one of the screw and nut members being stationary with respect to the angle bar and the other screw and nut member being connected for transmitting its longitudinal movements to the spacing member, and the circle to which the longitudinal axis of the spacing member is tangent having a circumference equal to 360 equal divisions of linear measurement, the unit of linear measurement being the inch.

15. Spacing apparatus including an angle member mounted for selective pivotal movement about an axis, and spacing means operatively mounted on the angle member, the spacing means including a longitudinally movable spacing member having its longitudinal axis of movement tangent to a single circle whose center is on the pivotal axis, the circumference of the circle to which the longitudinal axis of the spacing member is tangent being equal to 360 equal divisions of linear measurement.

FRANK TYSON.